(12) United States Patent
Sugiura

(10) Patent No.: US 8,498,993 B2
(45) Date of Patent: Jul. 30, 2013

(54) INFORMATION ACQUIRING APPARATUS, INFORMATION ACQUIRING PROGRAM, RECORDING MEDIUM, INFORMATION ACQUIRING METHOD AND INFORMATION ACQUIRING SYSTEM

(75) Inventor: Kenji Sugiura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/387,955

(22) PCT Filed: Jul. 22, 2010

(86) PCT No.: PCT/JP2010/062312
§ 371 (c)(1),
(2), (4) Date: Jan. 30, 2012

(87) PCT Pub. No.: WO2011/024585
PCT Pub. Date: Mar. 3, 2011

(65) Prior Publication Data
US 2012/0131019 A1 May 24, 2012

(30) Foreign Application Priority Data
Aug. 25, 2009 (JP) .................................. 2009-194669

(51) Int. Cl.
*G06F 17/30* (2006.01)
(52) U.S. Cl.
USPC ........................................................ 707/748
(58) Field of Classification Search
USPC .................. 707/6, 741, 748; 709/223
See application file for complete search history.

(56) References Cited

U.S. PATENT DOCUMENTS

| 7,818,324 B1 * | 10/2010 | Held et al. ..................... 707/741 |
| 2008/0005107 A1 * | 1/2008 | Funaki .............................. 707/6 |
| 2009/0307629 A1 | 12/2009 | Horiuchi et al. |

FOREIGN PATENT DOCUMENTS

| JP | 5-143647 A | 6/1993 |
| JP | 5-189484 A | 7/1993 |
| JP | 10-289251 A | 10/1998 |
| JP | 2000-322427 A | 11/2000 |
| WO | WO 2007/066662 A1 | 6/2007 |

\* cited by examiner

*Primary Examiner* — Etienne Leroux
(74) *Attorney, Agent, or Firm* — Sughrue Mion, PLLC

(57) ABSTRACT

There is provided an information acquiring apparatus which, when the user searches for information using a plurality of keywords, can facilitate an operation of selecting a plurality of keywords by means of a touch panel and improve the operability. The information acquiring apparatus makes an input means (109) integrated with a display means display a plurality of first objects (521) respectively corresponding to a plurality of keywords, and move positions of part or all of the first objects in response to the user's operation of the input means and display the first objects, when a plurality of first objects contact based on that the positions of at least part of a plurality of displayed first objects are moved and at least part of the first objects are displayed, determines a keyword corresponding to each contacting first object as a search key, and acquires search result information searched in either an external information search apparatus or inner information searching means based on the determined search key.

11 Claims, 13 Drawing Sheets

INFORMATION ACQUIRING APPARATUS, INFORMATION ACQUIRING PROGRAM, RECORDING MEDIUM, INFORMATION ACQUIRING METHOD AND INFORMATION ACQUIRING SYSTEM

CROSS REFERENCE TO RELATED APPLICATIONS

This application is a National Stage of International Application No. PCT/JP2010/062312, filed on Jul. 22, 2010, which claims priority from Japanese Patent Application No. 2009-194669, filed on Aug. 25, 2009, the contents of all of which are incorporated herein by reference in their entirety.

TECHNICAL FIELD

The present invention relates to an information acquiring apparatus, an information acquiring program, a recording medium, an information acquiring method and an information acquiring system which make users select a search key used to search for information, and acquire information related to a search result based on the selected search key.

BACKGROUND ART

Conventionally, information is frequently searched for by accessing an information search server from a terminal apparatus through a network. To search for information, the user needs to input a search key such as a search keyword related to desired information to a terminal apparatus. However, the information amount obtained as a result of searching becomes enormous depending on how the search key is selected, and the user needs to select desired information from the enormous amount of information.

A technique of Patent Document 1 is disclosed for solving these problems. According to the technique of Patent Document 1, sentences obtained as search results and a plurality of keywords included in the sentences are presented to the user together with the frequency of use. By this means, the user can add an appropriate keyword to a search condition by acquiring desired information from the presented keywords, so that it is possible to provide an effect of acquiring desired information from the enormous amount of information.

However, Patent Document 1 does not mention to a user interface which receives an operation to determine a search key, for example, to add a keyword.

By contrast with this, in recent years, a terminal apparatus used to search for information is also developed, and a touch panel type terminal apparatus which has, as an interface, a touch panel which integrates display means and input means enables an intuitive operation, and therefore has good reputation. When information is searched for by this touch panel type terminal apparatus, for example, a software keyboard is displayed on the touch panel so that the user inputs a search keyword on the touch panel, and an icon such as a search genre is displayed on the touch panel so that the user specifies a desired icon on the touch panel to perform searching.

CITATION LIST

Patent Document

Patent Document 1: Japanese Patent Application Laid-Open No. 5-143647

SUMMARY OF THE INVENTION

Problems to be Solved by the Invention

However, although a searching method of a conventional touch panel type terminal apparatus enables an intuitive operation, this searching method does not take advantage of convenience of the touch panel sufficiently, and therefore the user has difficulty in selecting a plurality of search keys when the user searches for information using a plurality of search keys.

In view of the above problems, an example of an object of the present invention is to provide an information acquiring apparatus, an information acquiring program, a recording medium, an information acquiring method and an information acquiring system which, when the user searches for information using a plurality of keywords, facilitate an operation of selecting a plurality of keywords by means of input means integrated with display means such as a touch panel and can improve the operability.

Means for Solving the Problems

To solve the above problem, the information acquiring apparatus according to an exemplary embodiment has: an object display control means that controls an input means integrated with a display means to display a plurality of first objects respectively corresponding to a plurality of keywords, and to move positions of part or all of the first objects in response to a user's operation of the input means and to display the first objects; a search key determining means that, when the plurality of first objects contact based on that the positions of at least part of the plurality of displayed first objects are moved and the at least part of the first objects are displayed, determines the keyword corresponding to each contacting first object as a search key; and a search result acquiring means that acquires search result information searched by either an external information search apparatus or an inner information searching means based on the determined search key.

According to this configuration, the object display control means controls the input means integrated with the display means such as a touch panel to display a plurality of first objects respectively corresponding to a plurality of keywords, and to move part or all of positions of the first objects in response to the user's operation of the input means and to display the first objects, when a plurality of first objects contact based on that the positions of at least part of a plurality of displayed first objects are moved and the first objects are displayed, the search key determining means determines a keyword corresponding to each contacting first object, and the search result acquiring means acquires search result information searched by either the external information search apparatus or internal information searching means based on the determined search key.

Consequently, with the information acquiring apparatus according to an exemplary embodiment, by operating the input means to make the first objects corresponding to a plurality of keywords which need to be used for searching contact among a plurality of first objects displayed on the input means integrated with the display means such as a touch panel, the user can select a set of keywords used for searching. That is, it is possible to provide an information acquiring apparatus which, when the user searches for information using a plurality of keywords, facilitates an operation of determining a plurality of search keywords on the touch panel and can improve the operability.

The information acquiring apparatus is the information acquiring apparatus according to an exemplary embodiment, and a second object different from the plurality of first objects are further displayed on the input means; and the search key determining means does not determine the keyword corresponding to the second object as a search key.

Consequently, with the information acquiring apparatus according to the exemplary embodiment, information is searched for only when specified objects (first objects) specified by the user contact, and information is not searched for when non-specified objects (second objects) which are not specified or a specified object and a non-specified object contact. That is, the user uses an object corresponding to a keyword used for searching as a specified object and does not need to avoid the object corresponding to a keyword which is not used for searching when the objects corresponding to the keyword used for searching contact, so that it is possible to reduce an operation load of the user. Further, even when the object corresponding to the keyword used for searching and another object contact before the user specifies the object, information is not searched for, so that it is possible to prevent an information search based on unintentional keywords.

The information acquiring apparatus is according to an exemplary embodiment, and the search key determining means determines as a higher ranking search key the keyword corresponding to a first object having a smaller movement amount among the plurality of first objects.

Consequently, with the information acquiring apparatus according to an exemplary embodiment, when the user operates the touch panel such that the first objects corresponding to a plurality of keywords used for searching among a plurality of first objects displayed on the display means such as a touch panel, the user can determine the priority of search keys to select based on the movement amount of each object by the user's operation (displacement amount of the coordinate of each object). That is, it is possible to provide an information acquiring apparatus which can reflect the user's intension more when the user operates and selects a plurality of search keys by means of the input means integrated with the display means such as a touch panel to search for information using a plurality of search keys.

The information acquiring apparatus according to an exemplary embodiment further has a transmitting means that transmits the selected search key to an external information search apparatus. Consequently, it is possible to reduce a search processing load by means of the external information search apparatus.

In the information acquiring apparatus according to an exemplary embodiment, the search result information includes a plurality of pieces of address information for specifying a plurality of pieces of information searched for based on the search key by either the external information search apparatus or the inner information searching means; and the information acquiring apparatus further has a search result display control means that controls the input means to display the plurality of pieces of address information in a list format.

Consequently, with the information acquiring apparatus according to an exemplary embodiment, the user can acquire in a list format a plurality of pieces of address information for specifying a plurality of pieces of information searched for based on the keywords selected by the user.

The information acquiring apparatus according to the exemplary embodiment has an address information selecting means that selects one of pieces of address information based on a user's operation, from a plurality of pieces of address information displayed in a list format on the input means by the search result display control means; and an information acquiring means that acquires information specified based on the selected address information; and an information display control means that controls the input means to display information acquired by the information acquiring means.

Consequently, with the information acquiring apparatus according to an exemplary embodiment, the user selects one of pieces of address information from a plurality of pieces of address information displayed in the list format on the input means integrated with the display means such as a touch panel, and can acquire information specified by this selected address information.

In the information acquiring apparatus according to an exemplary embodiment the search result information includes one address information for specifying one information searched for based on the search key by either the external information search apparatus or the inner information searching means; and the information acquiring apparatus has: an information acquiring means that acquires information specified by the one address information; and an information display control means that controls the input means to display information acquired by the information acquiring means.

Consequently, with the information acquiring apparatus according to an exemplary embodiment, the user can obtain one information searched for based on the keyword selected by the user. Further, the user does not need to perform an operation of, for example, selecting address information from the list, so that the amount of the user's operation from selection of a search key to acquisition of information is a little.

The information acquiring program according to an exemplary embodiment causes a computer to function as: an object display control means that controls an input means integrated with a display means to display a plurality of first objects respectively corresponding to a plurality of keywords, and to move positions of part or all of the first objects in response to a user's operation of the input means and to display the first objects; a search key determining means that, when the plurality of first objects contact based on that the positions of at least part of the plurality of displayed first objects are moved and the at least part of the first objects are displayed, determines the keyword corresponding to each contacting first object as a search key; and a search result acquiring means that acquires search result information searched by either an external information search apparatus or an inner information searching means based on the determined search key.

In the recording medium according to an exemplary embodiment, an information acquiring program which causes a computer to function as: an object display control means that controls an input means integrated with a display means to display a plurality of first objects respectively corresponding to a plurality of keywords, and to move positions of part or all of the first objects in response to a user's operation of the input means and to display the first objects; a search key determining means that, when the plurality of first objects contact based on that the positions of at least part of the plurality of displayed first objects are moved and the at least part of the first objects are displayed, determines the keyword corresponding to each contacting first object as a search key; and a search result acquiring means that acquires search result information searched by either an external information search apparatus or an inner information searching means based on the determined search key, is computer-readably recorded.

The information acquiring method according to an exemplary embodiment includes: an object display control step of controlling an input means integrated with a display means to display a plurality of first objects respectively corresponding to a plurality of keywords, and to move positions of part or all of the first objects in response to a user's operation of the input means and to display the first objects; a search key determining step of, when the plurality of first objects contact based on that the positions of at least part of the plurality of displayed first objects are moved and the at least part of the first objects are displayed, determining the keyword corresponding to each contacting first object as a search key; and a search result acquiring step of acquiring search result information searched either by an external information search apparatus or an inner information searching means based on the determined search key.

The information acquiring apparatus according to an exemplary embodiment an object display control means that controls a touch panel to display a plurality of objects respectively corresponding to a plurality of search keys, and to move and display the objects in response to a user's operation of the touch panel; a search key determining means that, when the plurality of objects contact based on that one or the plurality of displayed objects are moved and displayed, determines the search key corresponding to each contacting first object as a search key; and a search result acquiring means that transmits the determined search key to an information search server, and acquires search result information related to information searched by the information search server based on the search key.

The information acquiring system according to an exemplary embodiment has an information acquiring apparatus that acquires information through a network, and an external information search apparatus that is connected to the information acquiring apparatus through the network and that performs searching based on a search key from the information acquiring apparatus, and the information acquiring apparatus has: an object display control means that controls an input means integrated with a display means to display a plurality of first objects respectively corresponding to a plurality of keywords, and to move positions of part or all of the first objects in response to a user's operation of the input means and to display the first objects; a search key determining means that, when the plurality of first objects contact based on that the positions of at least part of the plurality of displayed first objects are moved and the at least part of the first objects are displayed, determines the keyword corresponding to each contacting first object as a search key; and a search result acquiring means that acquires search result information searched by the external information search apparatus based on the determined search key.

Effect of the Invention

Consequently, according to the present invention, the user operates the input means integrated with the display means such that first objects respectively corresponding to a plurality of keywords which need to be used for searching, contact among a plurality of first objects displayed on the input means integrated with the display means such as a touch panel, and can select a set of search keys used for searching. That is, it is possible to provide an information acquiring apparatus which facilitates an operation of selecting a plurality of keywords by means of the input means integrated with the display means such as a touch panel when the user searches for information using a plurality of keywords, and can improve the operability for reflecting the user's intension.

BEST MODES FOR CARRYING OUT THE INVENTION

Hereinafter, an embodiment of the present invention will be described with reference to the drawings. In addition, with the present embodiment, the present invention is applied to a mobile terminal in which information search application software (hereinafter "information search application") is installed.

The information search application presents to the user a plurality of relevant keywords based on keywords (basic keywords) inputted by the user, searches for information based on a plurality of keywords (search keywords) selected by the user from the relevant keywords and provides information to the user. In addition, with the present embodiment, processing of extracting relevant keywords based on basic keywords and processing of searching for information based on search keywords selected by the user are performed by an information search server connected with a mobile terminal through a network.

Figure 1:
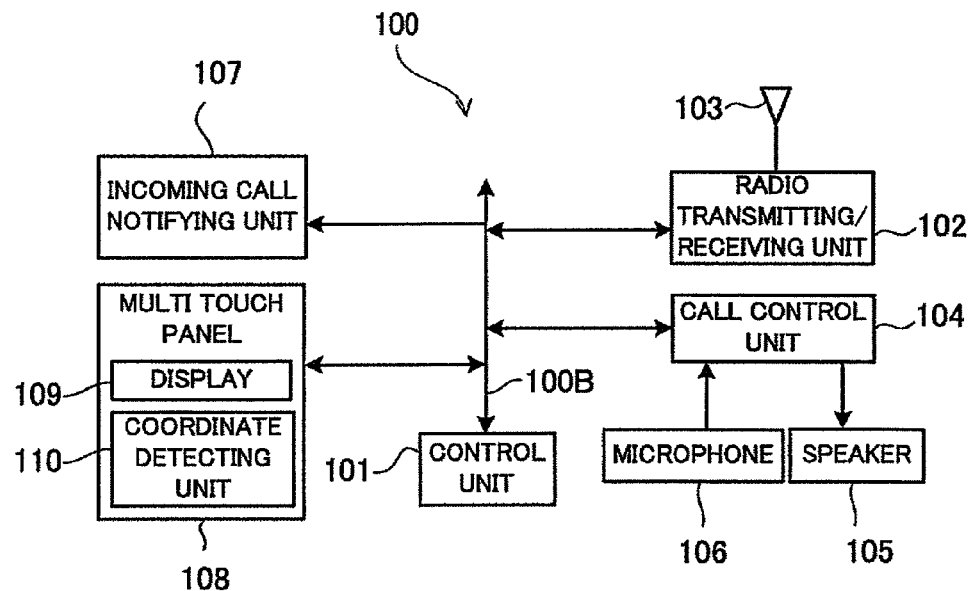
FIG. 1 is a block diagram of a mobile terminal 100 according to an embodiment.

First, a configuration of a mobile terminal (for example, mobile telephone) 100 will be described using FIG. 1. As illustrated in FIG. 1, the mobile terminal 100 according to the present embodiment has a control unit 101, a radio transmitting/receiving unit 102, an antenna 103, a call control unit 104, a speaker 105, a microphone 106, an incoming call notifying unit 107 and a multi touch panel (an example of an input means integrated with a display means) 108. Further, the control unit 101, radio transmitting/receiving unit 102, call control unit 104, incoming call notifying unit 107 and multi touch panel 108 are connected by a bus 100B to transmit and receive such as data or signals.

The control unit 101 is configured mainly with a CPU and has memories such as ROM and RAM, and the CPU reads the stored various control programs and performs various control of the mobile terminal 100 by executing the control program while using the RAM if necessary. Particularly, the control unit 101 executes the program related to the information search application to function as an object display control means, a search key determining means, a search result acquiring means, a search result display control means, an address information selecting means, an information acquiring means, an information display control means and an information searching means. In addition, when the RAM is non-volatile, a search database may be constructed in the RAM.

The radio transmitting/receiving unit 102 accesses a network such as a mobile communication network through the antenna 103, and transmits and receives various types of data such as audio data, message data and image data to and from other apparatuses which have a communication means.

In addition, the radio transmitting/receiving unit 102 performs wireless LAN (Local Area Network) communication such as Wi-Fi (wireless fidelity) and near field communication such as Bluetooth. Further, with the mobile terminal 100, the radio transmitting/receiving unit 102 can utilize network environment such an IP (Internet Protocol) communication network, a next generation network, and a fixed communication network (for example, public switched telephone network).

Further, the radio transmitting/receiving unit 102 accesses the information search server through the mobile communication network while the information search application is activated, and establishes a link to transmit and receive various types of data. Data transmitted from the mobile terminal 100 to the information search server is, for example, basic keywords or search keywords. By contrast with this, data received by the mobile terminal 100 from the information search server is, for example, relevant keyword data or search result data which will be described below. Further, the radio transmitting/receiving unit 102 acquires information (for example, structured document such as HTML (HyperText Markup Language)) specified by address information (for example, URL (Uniform Resource Locator)).

The multi touch panel 108 plays a role of a display of the mobile terminal 100 and plays a role of an input device. To play these functions, the multi touch panel 108 has a display 109 and a coordinate detecting unit 110 which detects a point (coordinate) when the user touches by a finger, a touch pen (stylus pen) and the like (hereinafter, "finger or the like"). Under control of the control unit 101, the display 109 displays various screens such as a keyword input screen and a relevant keyword screen which will be described below. The coordinate detecting unit 110 transmits to the control unit 101 a coordinate signal indicating the coordinate touched by the user on these various screens. Further, the control unit 101 decides which coordinate on a display screen is touched based on the received coordinate signal, detects a user's input operation in accordance with an object displayed on the coordinate or the type of, for example, input buttons which will be described below, or detects a balloon specifying operation or moving/displaying operation which will be described below. By this means, the user can input information by touching an object or input button displayed on the display 109, and perform the balloon specifying operation or moving/displaying operation. In addition, the coordinate detecting unit 110 may be configured as part of the display 109.

Further, for the multi touch panel 108, the optical coordinate detecting unit 110 is used which enables multipoint detection (can detect touch on a plurality of points (coordinates) simultaneously). The optical coordinate detecting unit 110 which uses an optical sensor system has an optical sensor built in each pixel of the panel forming the display 109, and detects the coordinate which the finger or the like comes close to or touches the display 109 by means of the optical sensor. In this way, the optical coordinate detecting unit 110 can detect the coordinate when the finger or the like comes close without directly touching the multi touch panel 108, and therefore an operation of moving the finger or the like close to the multi touch panel 108 in a range in which the coordinate detecting unit 110 can detect the coordinate will be described as a touch operation. In addition, although the coordinate detecting unit 110 will be described with the present embodiment as the optical coordinate detecting unit 110 which uses an optical sensor system, other optical coordinate detecting units can be used as long as they enable multipoint detection. Further, the coordinate detecting unit is not limited to the optical system, and coordinate detecting units of various systems such as a static system or pressure system can be used as long as they enable multipoint detection.

Figure 2:
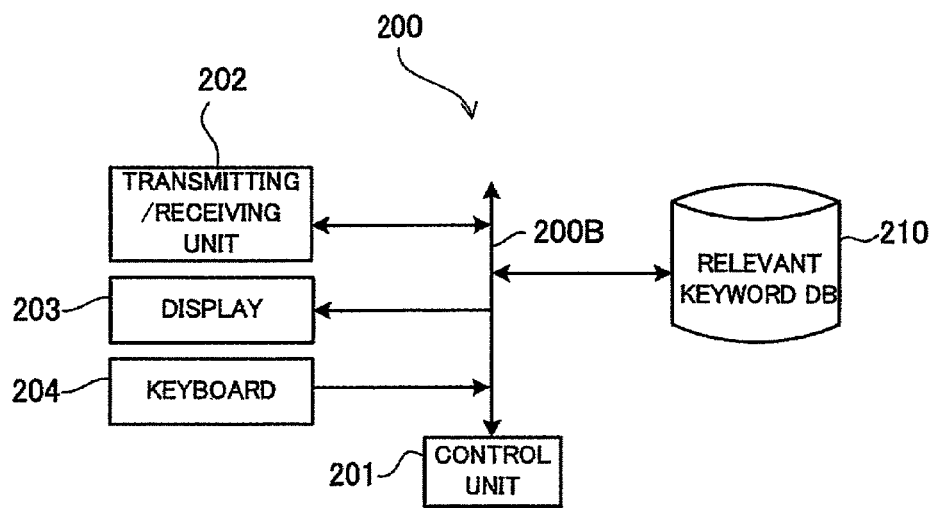
FIG. 2 is a block diagram of an information search server 200 according to an embodiment.

Next, a configuration of an information search server 200 will be described using FIG. 2. As illustrated in FIG. 2, the information search server 200 (an example of an external information search apparatus) according to the present embodiment has a control unit 201, a transmitting/receiving unit 202, a display 203, a keyboard 204 and a relevant keyword database (hereinafter "relevant keyword DB") 210. Further, these components are connected with each other through a bus 200B, and transmit and receive, for example, data and signals.

The control unit 201 is configured mainly with a CPU and has memories such as ROM and RAM, and the CPU reads the stored various control programs and performs various control of the information search server 200 by executing the control program while using the RAM if necessary.

The transmitting/receiving unit 202 establishes a link with the mobile terminal 100 and transmits and receives various types of data through a network when the information search application is activated in the mobile terminal 100.

The display 203 and keyboard 204 are used when the administrator for the information search server 200 maintains and manages the information search server 200.

In the relevant keyword DB 210, multiple keywords are registered, and relevance degree information showing the relevance degree of each keyword is registered.

When receiving basic keywords from the mobile terminal 100, the control unit 201 refers to the relevant keyword DB 210 and extracts relevant keywords having the relevance degree with the basic keywords equal to or more than a predetermined value. Next, the control unit 201 refers to the relevant keyword DB 210, and extracts keywords (hereinafter "relevant keywords (child)") having the relevance degree with the extracted relevant keywords equal to or more than a predetermined value. That is, the relationship between the basic keywords, relevant keywords and relevant keywords (child) is a tree structure using basic keywords as root nodes. In addition, the control unit 201 extracts relevant keywords and relevant keywords (child) per basic keyword when the number of basic keywords received from the mobile terminal 100 is plural.

In addition, the control unit 201 also acquires the relevance degree between each keyword when extracting the relevant keywords and relevant keywords (child). An example of the relevance degree includes, for example, frequency of the usage of keywords used as search keywords together with other keywords (for example, by AND search), when information is searched for. That is, in case of this example, the relevant keywords are frequently used together with basic keywords to search for information.

With the present embodiment, relevant keywords and relevant keywords (child) extracted by the control unit 201, and data showing the relevance degree (the relevance degree of the basic keywords and relevant keywords, and the relevance degree of the relevant keywords and relevant keywords (child)) between each keyword acquired by the control unit 201 are collectively referred to as "relevant keyword data". The relevant keyword data is transmitted from the information search server 200 to the mobile terminal 100 in response to reception of the basic keywords at the information search server 200.

Further, when receiving search keywords from the mobile terminal 100, the control unit 201 searches for information using a search engine based on the search keywords, and acquires a list of address information for specifying the searched information. In this case, the control unit 101 also acquires at least part of each searched information (hereinafter "reference information") such that the user can understand content of each information specified based on each address information included in the list. Information of a search target includes, for example, text information such as HTML document which includes search keywords or is relevant to the search keywords, or image information which is relevant to the search keywords. Further, reference information is, for example, a portion of HTML document including search keywords.

With the present embodiment, the list of address information acquired by the control unit 201 and reference information are collectively referred to as "search result data". Search result data is transmitted from the information search server 200 to the mobile terminal 100 in response to reception of search keywords at the information search server 200.

In addition, although, with the present embodiment, the control unit 201 receives a plurality of search keywords from the mobile terminal 100, and a search engine may be used in accordance with a search condition (AND search or OR search, and the priority in a search query) set in advance. Further, the search engine connected with the information search server 200 through the network may be utilized, or the search engine provided in the information search server 200 may be utilized.

Next, the information search application will be described with reference to FIG. 3. The information search application is activated when the control unit 101 detects an operation of activating the information search application (for example, a user's operation of touching an icon indicating an information search application on the menu screen (not illustrated)).

Figure 3A:
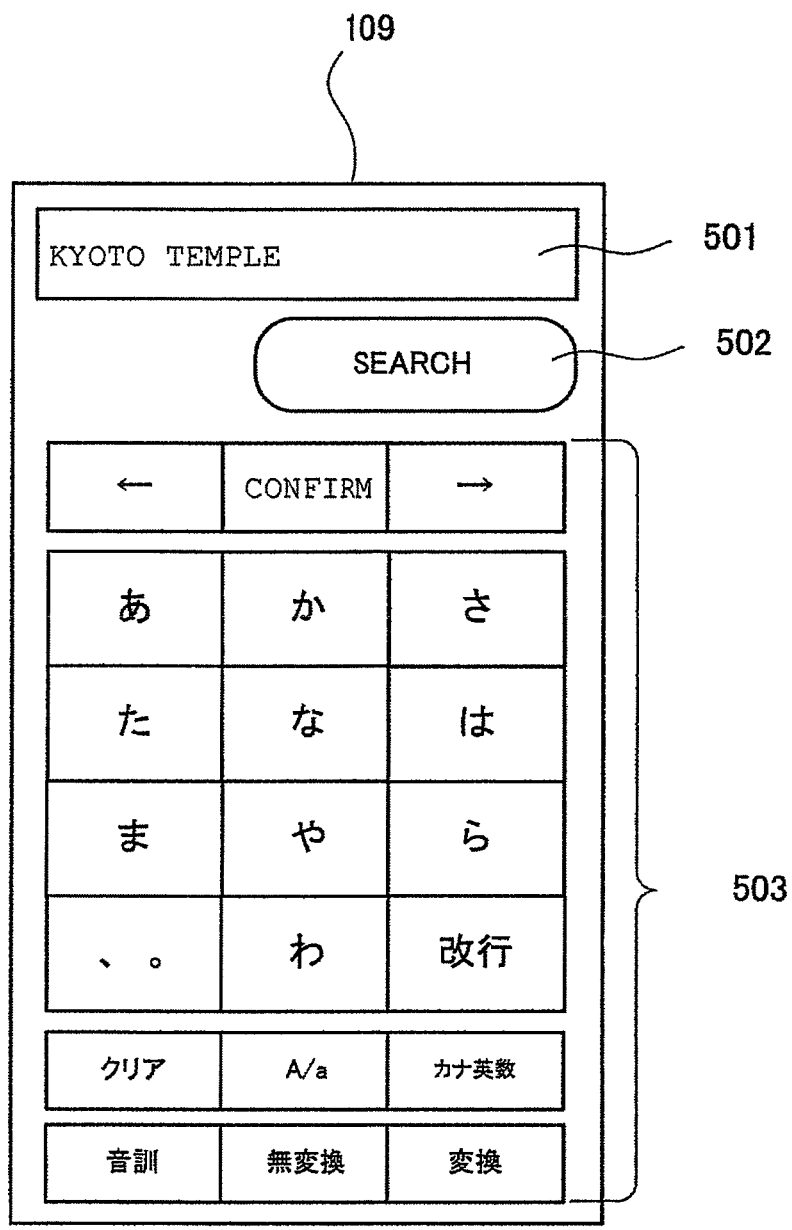
FIGS. 3A, 3B, 3C and 3D are views illustrating a screen example when search keys are selected on the mobile terminal 100 according to an embodiment.

When the information search application is activated, a keyword input screen is displayed on the display 109 as illustrated in FIG. 3A. The keyword input screen includes a keyword input area 501, a search button 502 and various input buttons 503 for inputting keywords. The input buttons 503 can support arrangements of mechanical keyboards of a plurality of types which conventional mobile terminals have, and are substituted for the function of a mechanical keyboard of at least one type upon input.

The user can similarly operate these buttons by touching an area which displays the search button 502 or input buttons 503. By operating the input buttons 503 on the keyword input screen, the user inputs keywords in the keyword input area 501 (keywords inputted in the keyword input area 501 are referred to "basic keywords"), and, next, by operating the search button 502, the user can start searching for keywords related to relevant the basic keywords.

When the keyword input screen is displayed, the control unit 101 decides which one of the search button 502 and various input buttons 503 is operated, based on a coordinate signal received from the coordinate detecting unit 110. When deciding that the user operates the input buttons 503, the control unit 101 displays letters on the keyword input area 501 in accordance with the type of the operated input buttons 503. Further, when deciding that the search button 502 is operated, the control unit 101 transmits the basic keywords inputted to the keyword input area 501, to the information search server 200. With the example of FIG. 3A, two basic keywords of "Kyoto" and "temple" are transmitted to the information search server 200.

When receiving the basic keywords from the mobile terminal 100, the information search server 200 refers to the relevant keyword DB 210, extracts the relevant keywords and relevant keywords (child), and transmits the extracted these keywords as relevant keyword data together with the relevance degree between each keyword, to the mobile terminal 100 as described above.

Figure 3B:
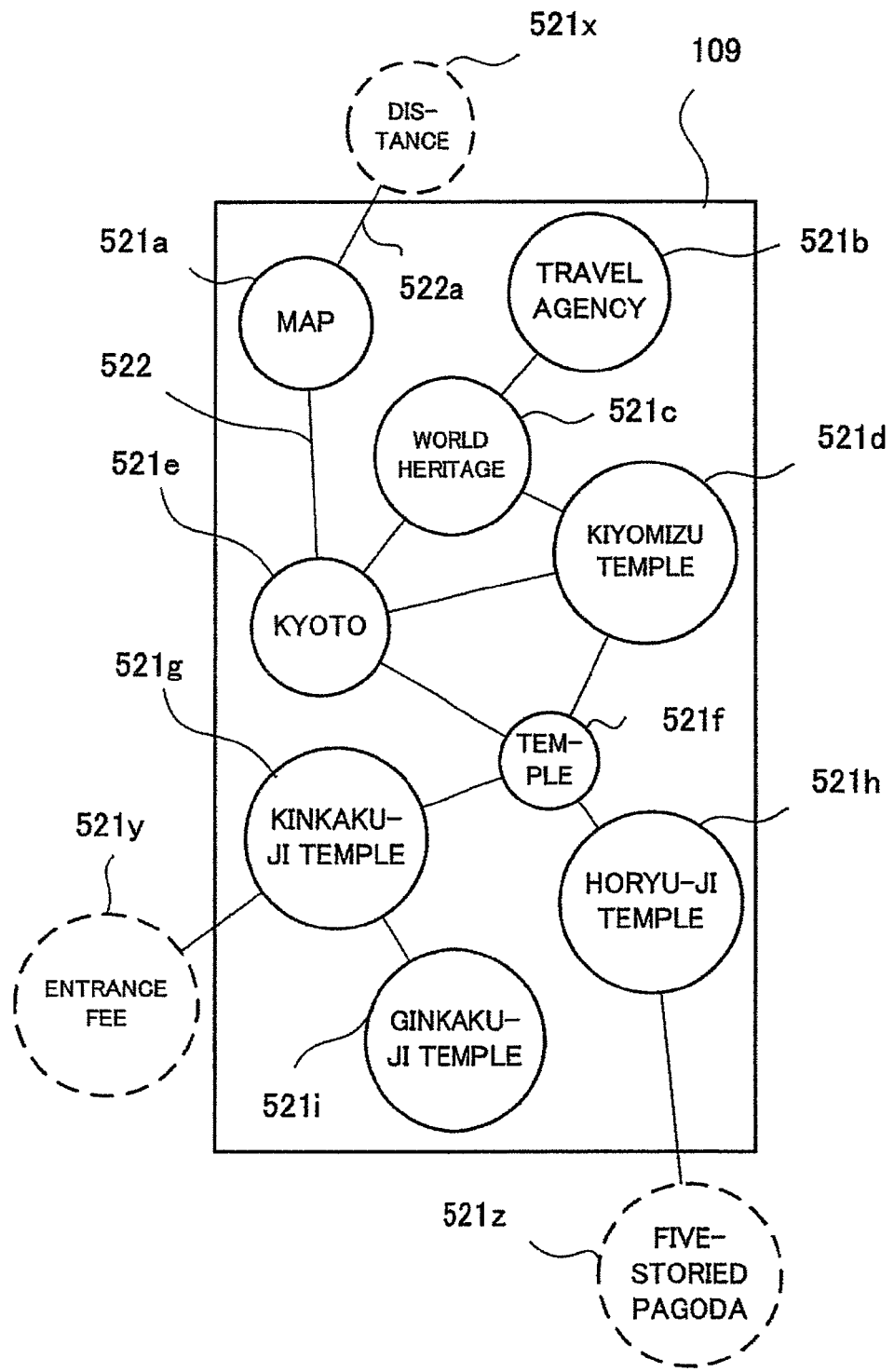

When receiving the relevant keyword data, the mobile terminal 100 displays the relevant keyword screen on the display 109 as illustrated in FIG. 3B. The relevant keyword screen displays a plurality of balloons 521 (521a to 521i and 521x to 521z are collectively referred to as "521"), and connectors 522 connecting each balloon 521. Each balloon 521 displays the basic keyword, relevant keyword and relevant keyword (child). The connector 522 connects the basic keyword and relevant keyword, or the relevant keyword and relevant keyword (child).

With the example of FIG. 3B, the relevant keywords of the basic keyword "Kyoto" are "map", "Kiyomizu temple" and "world heritage". Further, the relevant keywords (child) of the relevant keyword "Kiyomizu temple" are "temple" and "world heritage", the relevant keywords (child) of the relevant keyword "world heritage" are "Kiyomizu temple" and "travel agency", and the relevant keyword (child) of the relevant keyword "map" is "distance". Similarly, the relevant keywords of the basic keyword "temple" are "Kiyomizu temple", "Kinkakuji temple" and "Horyu-ji temple". Further, the relevant keywords (child) of the relevant keyword "Kiyomizu temple" are "Kyoto" and "world heritage", the relevant keywords (child) of the relevant keyword "Kinkakuji temple" are "Ginkakuji temple" and "entrance fee" and the relevant keyword (child) of the relevant keyword "Horyu-ji temple" is "five-story pagoda".

Further, with the example of FIG. 3B, although a balloon 521x which displays "distance", a balloon 521y which displays "entrance fee", and a balloon 521z which displays "five-story pagoda" are not displayed in the screen of the display 109, the user performs moving/displaying operation of moving the positions of the balloons 521a, 521g and 521h connected with the balloons 521x, 521y and 521z through the connector 522 and displaying the balloons 521a, 521g and 521h (moving/displaying), and the balloons 521x, 521y and 521z can be moved in the screen to display. For example, the user performs a moving/displaying operation of moving and displaying a balloon 521a below by dragging the balloon 521x connected through the connector 522a to display in the screen of the display 109. Meanwhile, the moving/displaying operation is started when the finger or the like touches an area which displays the balloon 521 of a target the position of which is moved and which is displayed, and moves the position of the balloon along a trajectory on which the finger or the like moves to display when the finger or the like is moved in a horizontal direction on the screen while the touched state is maintained.

In addition, the initial arrangement of each balloon 521 on the relevant keyword screen is determined based on the relevance degree between each keyword included in relevant keyword data.

Figure 3C:
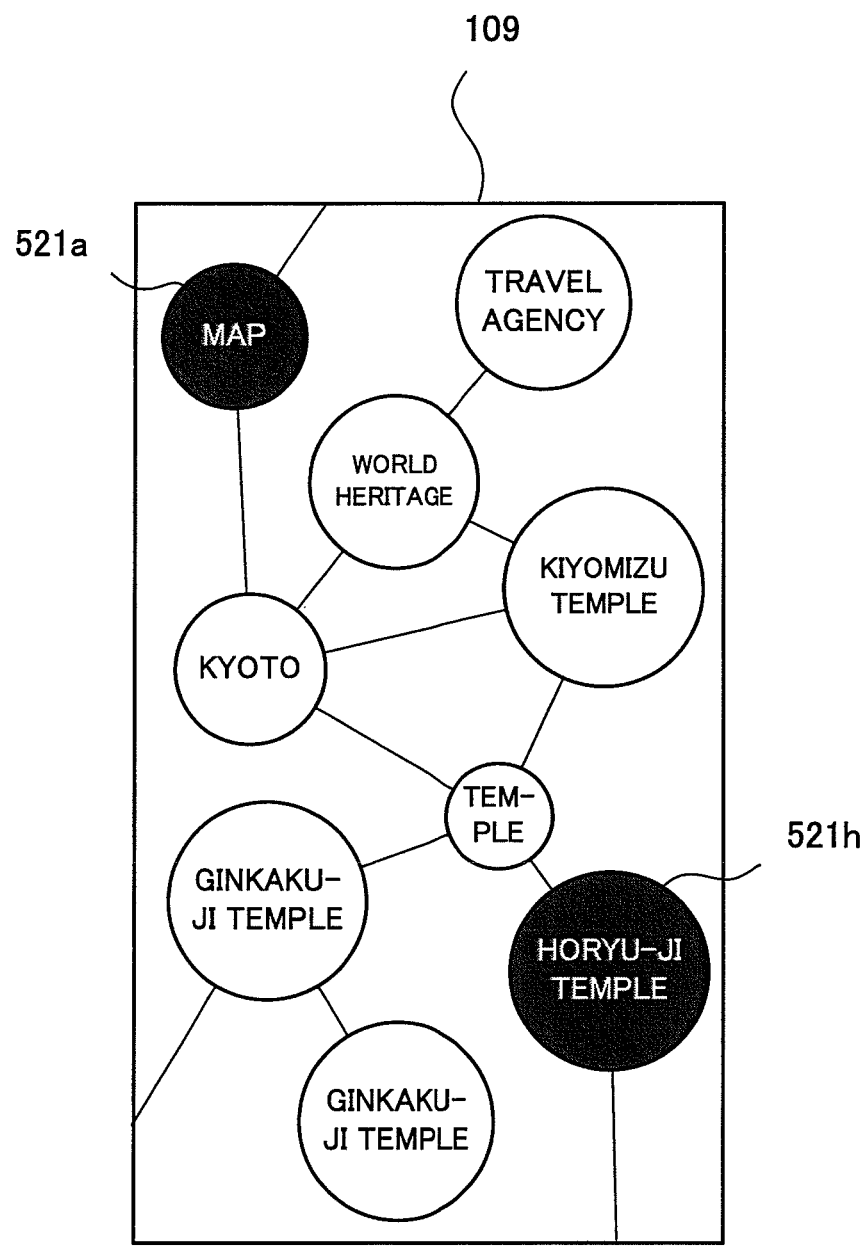
Figure 3D:
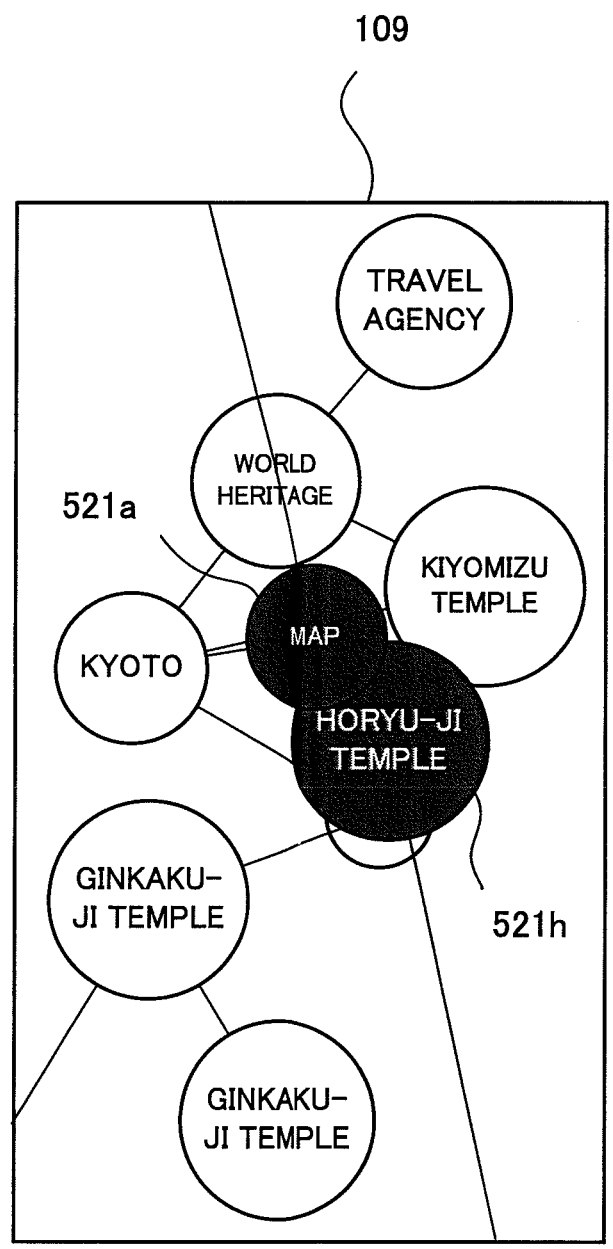

The user performs, for example, a double touch operation (referred to as "balloon specifying operation") of touching an area which displays the balloon 521, on the relevant keyword screen twice in a short time (for example, 500 milliseconds) and the balloon 521 can be placed in the specified state as illustrated in FIG. 3C (in FIG. 3C, the balloons 521a and 521h are in the specified state. Hereinafter, the balloons in the specified state are referred to as "specified state balloons"). In this case, the user performs the balloon specifying operation for a plurality of balloons 521 simultaneously or sequentially, and can make the respective balloons 521 the specified state balloons. Further, the user performs a moving/displaying operation for at least one of the balloons 521 displayed on the relevant keyword screen, the position of the balloon 521 which is the target of the moving/displaying operation can be moved the balloon 521 can be displayed. By this means, the user performs a balloon specifying operation and moving/displaying operation, the positions of the specified state balloons 521a and 521h can be moved and the specified state balloons 521a and 521h can be displayed, and make the specified state balloons 521a and 521h contact each other as illustrated in FIG. 3D. Further, when the specified state balloons 521a and 521h contact each other, information is searched for based on the keyword (search keyword) displayed on each of the contacting specified state balloons 521a and 521h.

Meanwhile, the specified state balloons 521a and 521h are examples of the first objects, and the balloons 521b to 521g, 521i, 521x, 521y and 521z which are not in the specified state are examples of the second objects (non-specified objects) different from the first objects. In the balloon specifying operation, the control unit 101 generates a specified state balloon, and distinguishes the specified state balloon from the balloon which is not in the specified state, and doesn't determine the keyword corresponding to the second object as a non-search key as an example of the search key determining means. In addition, the balloon specifying operation may be an operation of pushing the area in which the balloon 521 is displayed, in a predetermined time or more.

When the relevant keyword screen is displayed, the control unit 101 decides whether or not the balloon specifying operation is performed for one of the balloons 521, based on the coordinate signal received from the coordinate detecting unit 110, and places the balloon 521 for which the balloon specifying operation is performed, in the specified state. In this case, the control unit 101, for example, reverses the color of the letters displayed on the balloon 521 to show that the balloon 521 is the specified state balloon.

Further, when detecting the moving/displaying operation of the balloon 521 displayed on the relevant keyword screen, the control unit 101 moves the position of the balloon 521 and displays the balloon 521 following the moving/displaying operation. More specifically, the control unit 101 moves the position of the balloon 521 displayed at the coordinate indicated by the coordinate signal when the moving/displaying operation starts, along the trajectory of the coordinate indicated by a subsequently received coordinate signal and the balloon 521 was displayed. In this case, the control unit 101 also moves the position of the balloon 521 connected with the balloon 521 which is the moving/displaying operation target, through the connector 522 by dragging the balloon 521 in response to movement of the balloon 521 which is the moving/displaying operation target, and the balloon 521 was displayed.

In addition, with processing subsequent to processing of moving the position of the balloon 521 to the coordinate indicated by the coordinate signal at the point of time when the moving/displaying operation is finished (at the point of time when the finger or like is separated from the multi touch panel 108) and displaying the balloon 521, the control unit 101 may finish moving and displaying this balloon 521 at the coordinate position or may further continue displaying and moving the balloon 521 until a predetermined condition is satisfied based on the moving speed at which the position of the balloon 521 was moved and the balloon 521 was displayed. Meanwhile, the predetermined condition may include, for example, the case that the balloon 521 which is the moving/displaying operation target contacts another balloon 521 or the case that a predetermined time passes.

Further, when the specified state balloons 521 contact each other, the control unit 101 selects each keyword displayed on the specified state balloon 521 to transmit to the information search server 200 as the search keyword. With the example of FIG. 3D, the two search keywords "map" and "Horyu-ji temple" are transmitted to the information search server 200.

Further, to decide whether or not the balloons 521 contact each other, the control unit 101 holds an outline coordinate group (which changes following the moving/displaying operation) indicating the outline of the balloon 521 by a set of point coordinates per balloon 521 when the relevant keyword screen is displayed. Further, when some of the point coordinates forming different outline coordinate groups match with each other, the control unit 101 decides that the balloons 521 corresponding to each outline coordinate group including the matched point coordinates contact each other.

Further, as to decision of contact, the reference coordinate (for example, the center coordinate of a circle and the center coordinate of an ellipse), and predetermined distances of, for example, the radius, long axis and short axis are stored per balloon, and whether or not the balloons contact each other may be decided based on the reference coordinate and predetermined distance. Further, when the distance of the reference coordinate or each inter-balloon distance such as the minimum distance between the balloons becomes shorter than a predetermined amount or shorter than a threshold due to the moving/displaying operation, the control unit 101 may decide that the balloons 521 contact each other.

Further, although the control unit 101 transmits the search keywords to the information search server 200 immediately after the specified state balloons 521 contact each other, instead of this, the control unit 101 may be configured to control the display 109 to display a check screen (not illustrated) to make the user check whether or not to execute searching based on each keyword displayed on the specified state balloon 521 when the specified state balloons 521 contact each other, and transmit the keyword to the information search server 200 as the search keywords only when an execution button (not illustrated) in the check screen is operated.

Further, the control unit 101 may be configured to select, as a higher ranking search keyword, a keyword displayed on the specified state balloon 521 having a smaller displacement amount of the coordinate indicated by the coordinate signal when the moving/displaying operation of each specified state balloon 521 is started and the coordinate indicated by the coordinate signal at the point of time when the moving/displaying operation is finished, and transmit the keyword to the information search server 200. Meanwhile, the "higher ranking" means that the priority in the search query occupies a higher rank. In this way, when receiving from the mobile terminal 100 a set of search keywords of different priorities in the search query, the control unit 201 of the information search 200 searches for information using the search engine in accordance with the priority of each search keyword in the search query.

As described above, when receiving the search keywords from the mobile terminal 100, the information search server 200 acquires search result data using the search engine and transmits this search result data to the mobile terminal 100.

When the mobile terminal 100 receives search result data, the display 109 displays a list of address information and reference information. Further, when the user selects one of pieces of address information (for example, touches the coordinate included in the area in which address information is displayed), the mobile terminal 100 acquires information specified based on this address information and displays this information on the display 109.

That is, when receiving search result data from the information search server 200, the control unit 101 controls the display 109 to display the list of address information and reference information, then selects address information displayed at the coordinate position indicated by the coordinate signal received from the coordinate detecting unit 110, acquires information based on this selected address information and controls the display 109 to display this information.

In addition, when a search database such as the relevant keyword DB 210 is formed in the RAM of the control unit 101, the control unit 101 which is an example of an inner searching means may generate a search query from the search keywords based on contact of the balloons instead of transmitting the search keywords to the information search server 200, and search for information similar to the control unit 201 of the information search server 200. The control unit 101 controls the display 109 to display the list of address information and reference information based on the search result data of the inner search means.

Figure 4:
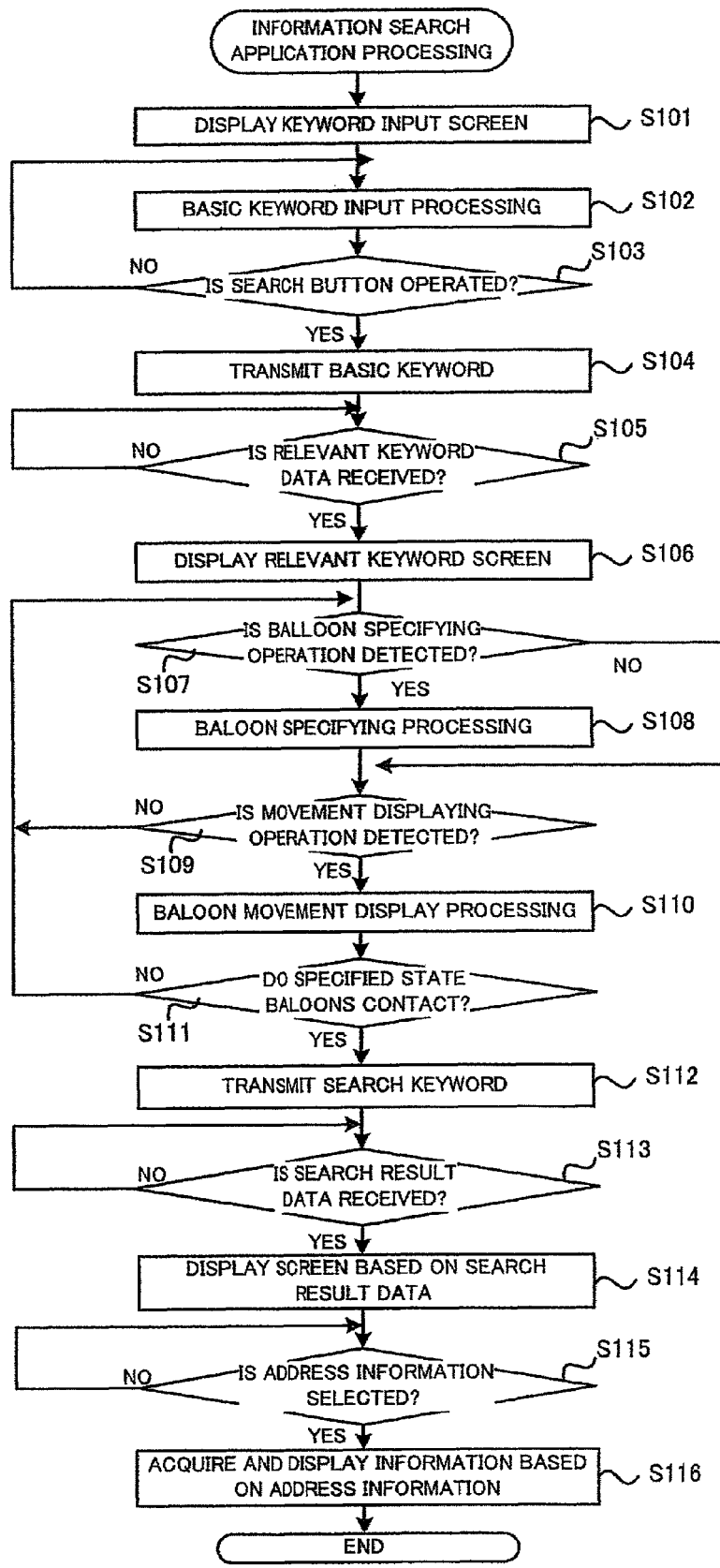
FIG. 4 is a flowchart illustrating an example of processing executed by a control unit 101 of the mobile terminal 100 according to an embodiment.

Next, the operation of the control unit 101 of the mobile terminal 100 according to the present embodiment will be described with reference to FIG. 4. FIG. 4 is a flowchart illustrating an example of information search application processing executed by the control unit 101 of the mobile terminal 100 according to the present embodiment. In addition, information search application processing is started when the user activates the information search application.

First, the control unit 101 controls the display 109 to display the keyword input screen (see FIG. 3A) when the information search application is activated (step S101). Next, the control unit 101 performs basic keyword input processing (step S102) until the search button 502 is operated (Step S103: NO). More specifically, in accordance with the operation of the input buttons 503, letters are displayed on the keyword input area 501. The control unit 101 transmits the basic keywords inputted to the keyword input area 501, to the information search server 200 (step S104) when the search button 502 is operated (step S103: YES). In addition, when the search button 502 is operated in a state where no keyword is inputted in the keyword input area 501, the control unit 101 displays an error message that no keyword is inputted in the keyword input area 501.

When transmitting the basic keywords to the information search server 200, the control unit 101 stands by until relevant keyword data is received from the information search server 200 (step S105: NO), and controls the display 109 to display the relevant keyword screen (see FIG. 3B) (step S106) when receiving relevant keyword data (step S105: YES).

Next, the control unit 101 decides whether or not the balloon specifying operation is detected (step S107), and performs processing of making a corresponding balloon a specified state balloon (step S108) (see FIG. 3C) when deciding that the balloon specifying operation is detected (step S107: YES). By contrast with this, when deciding that the balloon specifying operation is not detected (step S107: NO) or performing processing in step S108, the control unit 101 then decides whether or not the moving/displaying operation is detected (step S109).

When deciding that the moving/displaying operation is not detected (step S109: NO), the control unit 101 transits to processing in step S107. By contrast with this, when deciding that the moving/displaying operation is detected (step S109: YES), the control unit 101 performs balloon moving/displaying processing (step S110). More specifically, the control unit 101 moves the position of the balloon which is the moving/displaying operation target and the position of the balloon connected with this balloon, based on the moving/displaying operation of the balloon, and the balloons are displayed. Further, as a result of moving the position of the balloon and displaying the balloon, the control unit 101 decides whether or not the specified state balloons contact each other (step S111).

When deciding that the specified state balloons do not contact each other (step S111: NO), the control unit 101 transits to processing in step S107. By contrast with this, when deciding that the specified state balloons contact each other (step S111: YES) (see FIG. 3D), the control unit 101 transmits the keyword displayed on each contacting specified state balloon to the information search server 200 as the search keyword (step S112).

When transmitting the search keyword to the information search server 200, the control unit 101 stands by until search result data is received from the information search server 200 (step S113: NO), and, when receiving search result data (step S113: YES), controls the display 109 to display the screen based on search result data (step S114). More specifically, the control unit 101 displays, in the list format, address information included in search result data and reference information.

Next, the control unit 101 stands by until the user selects one of pieces of address information displayed on the display 109 in the list format (step S115: NO), and, when one of pieces of address information is selected (step S115: YES), acquires information specified based on the address information through the radio transmitting/receiving unit 102 and controls the display 109 to display information (step S116). Further, the control unit 101 finishes the information search application based on the user's finishing operation.

As described above, with the mobile terminal 100 (an example of "information acquiring apparatus" of the present invention) according to the present embodiment, the control unit 101 (an example of "object display control means") controls the multi touch panel 108 (an example of "the input means integrated with the display means such as a touch panel") to display a plurality of balloons 521 (an example of "object") respectively corresponding to a plurality of keywords (an example of "search keys"), and moves the position of the balloon 521 in response to the user's operation of the multi touch panel 108 and the balloon 521 is displayed. Further, when a plurality of balloons 521 contact each other following movement and display of one or a plurality of displayed balloons 521, the control unit 101 (an example of "search key determining means") determines the keyword corresponding to each contacting balloon 521 as the search keyword (an example of "search key").

Thus, the control unit 101 controls the input means integrated with the display means to display a plurality of first objects (for example, balloons 521) respectively corresponding to a plurality of keywords, and moves the positions of part or all of the first objects in response to the user's operation of the input means and the first objects are displayed.

Meanwhile, the positions of part of the first objects are moved and the first objects are displayed when, for example, only the balloon 521*a* is specified, the position of the balloon 521*a* is moved and the balloon 521*a* is displayed. In this case, when the balloon 521*a* is specified and contacts the balloon 521*h* which is not moved, the control unit 101 may decide that the balloons 521 contact each other. Further, when the balloon 521*a* which is displayed after the positions of part of the first object are moved contacts, for example, the non-specified state balloon 521*b* which is an example of the second object for a predetermined time and touch of the user's finger separates, the control unit 101 may decide that the balloons 521 contact each other. In addition, processing performed at this point of time corresponds to the balloon specifying operation is performed.

Further, the control unit 101 (an example of "search result acquiring means") transmits the determined search keyword to the information search server 200, and acquires search result data (an example of "search result information") related to information searched for based on the search keyword by the information search server 200. In this way, the control unit 101 acquires search result information searched in the information search server 200 based on the determined search key.

Consequently, with the mobile terminal 100 according to the present embodiment, the user can select a set of search keywords used for searching, by performing the moving/displaying operation of the touch panel 108 such that the balloons 521 corresponding to a plurality of keywords which need to be used for searching among a plurality of balloons 521 displayed on the multi touch panel 108 contact each other. That is, it is possible to provide an information acquiring apparatus which can reflect the user's intension more when the user operates the touch panel and selects a plurality of search keywords to search for information using search keywords. Further, performing the moving/displaying operation is interesting, and this stimulates the user's desire to search for information.

Further, only when a plurality of specified state balloons 521 (an example of "specified objects (first objects)") specified by the user's balloon specifying operation, the control unit 101 of the mobile terminal 100 selects the keyword corresponding to each contacting specified state balloon as the search keyword.

Consequently, according to the present embodiment, information is searched for only when the specified state balloons specified by the user contact each other, and information is not searched for when balloons (an example of "non-specified objects (second objects)") which are not in the specified state contact each other and when the specified state balloon and the balloon which is not in the specified state contact each other. That is, by making a balloon corresponding to a keyword which needs to be used for searching, a specified state balloon, the user does not need to perform the moving/displaying operation to avoid balloons corresponding to keywords which are not used for searching when balloons corresponding to keywords which need to be used for searching contact, so that it is possible to reduce the burden of the user's operation. Further, even if a balloon corresponding to the keyword which is not used for searching and another balloon contact before the user performs the balloon specifying operation, information is not searched for, so that it is possible to prevent search for information based on unintentional search keywords.

Further, as described above in the present embodiment, a configuration is possible where, when the specified state balloons 521 contact each other, a keyword displayed on the specified state balloon having a smaller displacement amount of the coordinate indicated by the coordinate signal when the moving/displaying operation of each specified state balloon is started and the coordinate indicated by the coordinate signal at the point of time when the moving/displaying operation is finished is selected as a higher ranking search keyword, and is transmitted to the information search server 200. With this configuration, by reflecting the movement amount of the specified state balloon (the displacement amount of the coordinates when the moving/displaying operation is started and finished), in the priority of a plurality of keywords determined to use for searching, it is possible to search for information based on the search keyword which is closer to the user's intension. In addition, although the keyword displayed on the specified state balloon having a smaller displacement amount is selected as a higher ranking search keyword, the same effect can be obtained even when a keyword displayed on the specified state balloon having a smaller displacement amount is selected as a "lower ranking" search keyword.

Further, with the present embodiment, search result data includes a plurality of pieces of address information for specifying a plurality of pieces of information searched for by the information search server 200 based on search keywords, and the control unit 101 (an example of "search result display control means") of the mobile terminal 100 controls the display 109 of the multi touch panel 108 to display a plurality of pieces of address information in a list format.

Consequently, according to the present embodiment, the user can obtain in a list format a plurality of pieces of address information for specifying a plurality of pieces of information searched for based on the search keywords selected by the user.

Furthermore, with the present embodiment, the control unit 101 (an example of "address information selecting means") of the mobile terminal 100 selects one of pieces of address information based on the user's operation from a plurality of pieces of address information displayed in the list format on the display 109 of the multi touch panel 108. Further, the control unit 101 (an example of "information display control means" and "information display control means") acquires information specified based on the selected address information through the radio transmitting/receiving unit 102, and controls the display 109 to display the acquired information.

Consequently, according to the present embodiment, by selecting one of pieces of address information from a plurality of pieces of address information displayed on the display 109 in the list format, the user can obtain information specified based on the selected address information.

Thus, with the present embodiment, when receiving the search keywords from the mobile terminal 100, the control unit 201 of the information search server 200 searches for information using the search engine, acquires a list of address information for specifying the searched information and transmits the list to the mobile terminal 100. Further, the control unit 101 of the mobile terminal 100 controls the display 109 to display the list, and makes the user select which information to access. Instead of this, with another embodiment, the control unit 201 of the information search server 200 searches for information using the search engine in response to reception of the search keyword from the mobile terminal 100, acquires one address information for specifying, for example, one information which is accessed most frequently, from among the searched information, and transmits the address information to the mobile terminal 100. Further, the control unit 101 (an example of "information display control means") of the mobile terminal 100 may be configured to acquire one information specified based on one address information and control the display 109 to display the information. When the configuration is employed, the user does not need to perform an operation of selecting address information from the list, so that the amount of the user's operation from selection of the search keyword to acquisition information is a little. In addition, one information specified based on one address information is not limited to information which is most frequently accessed, and may be, for example, one information which is selected at random from a plurality of pieces of information searched by the search engine or may be information related to a company which, for example, provides or supports the search engine.

Further, a configuration is employed with the present embodiment where, instead of searching for information based on the basic keyword, the relevant keyword extracted based on the basic keyword or relevant keyword (child) is once presented to the user, and information is searched for based on the keyword selected from these keywords. With this configuration, even when the user has no idea of an effective keyword for searching desired information, it is possible to provide an opportunity of selecting a more adequate keyword from the relevant keywords or relevant keywords (child). Further, the user may be interested in searching for information different from information which the user originally desired, based on the presented relevant keywords and relevant keywords (child), and eventually the user's desire of searching for information is stimulated.

Further, with the present embodiment, although the mobile terminal 100 has been described as the information acquiring apparatus of the present invention, a computer having a multi touch panel or a computer connected with the multi touch panel may be employed as the information acquiring apparatus of the present invention. For example, by recording programs (an example of "information acquiring program" of the present invention) corresponding to processing of the above control unit 101, in a compact disc or hard disc, and reading and executing these programs by the computer, it is possible to utilize the computer as the information acquiring apparatus.

Furthermore, although, with the present embodiment, the basic keyword, relevant keyword, relevant keyword (child) or search keyword is a search key of the present invention, the search key image may be a search key with another embodiment. More specifically, when the user inputs the basic keyword and operates the search button, the balloon is displayed on the multi touch panel and relevant images (or relevant images instead of a balloon) related to the basic keyword in the balloon are displayed. Further, when display of a balloon is controlled in accordance with the user's balloon specifying operation or moving/displaying operation with respect to the specified state balloon, and when a plurality of specified state balloons contact (or relevant images contact), a list of web pages including relevant images displayed in each contacting balloon is displayed.

Furthermore, although the round balloon shape has been illustrated and described with the present embodiment, the balloon shape is not limited to the round shape and may be polygonal, a star shape or a heart shape.

Next, a screen example in the information search application activated in a mobile terminal 600 will be described with reference to FIGS. 5A to 5D.

FIGS. 5A to 5D are views illustrating screen examples when a search key is selected in a mobile terminal 600 according to an embodiment.

In addition, this screen example is an English version of FIG. 3, correspondences of terms and reference numerals will be mainly described, and details of the configurations, functions, operations and effects will not be described. Further, as illustrated in FIG. 5A, unlike the mobile terminal 100, the mobile terminal 600 has a mechanical keyboard 603B in addition to input buttons 603 of a software keyboard, and, for example, the other configurations and functions are the same as in the mobile terminal 100.

Figure 6A:
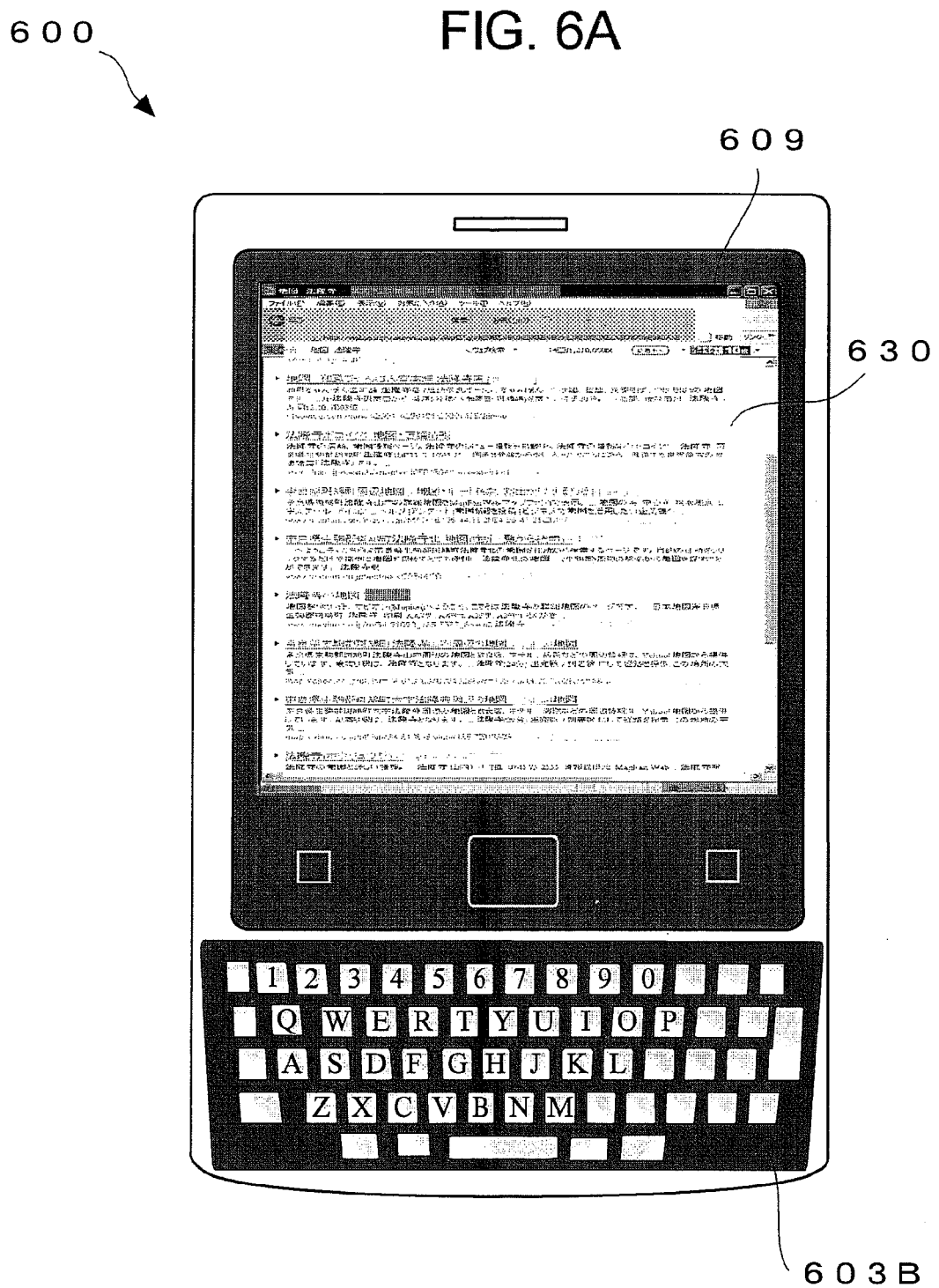
FIG. 6A is a schematic view illustrating an example of a search result displayed on the mobile terminal 600 according to an embodiment.

When the information search application is activated, as illustrated in FIG. 6A, a keyword input screen is displayed on a display 609 (corresponding to the display 109). The keyword input screen includes a keyword input area 601 (corresponding to the keyword input area 501), a search button 602 (corresponding to the search button 502) and various input buttons 603 (corresponding to the input buttons 503) for inputting keywords.

Figure 5A:
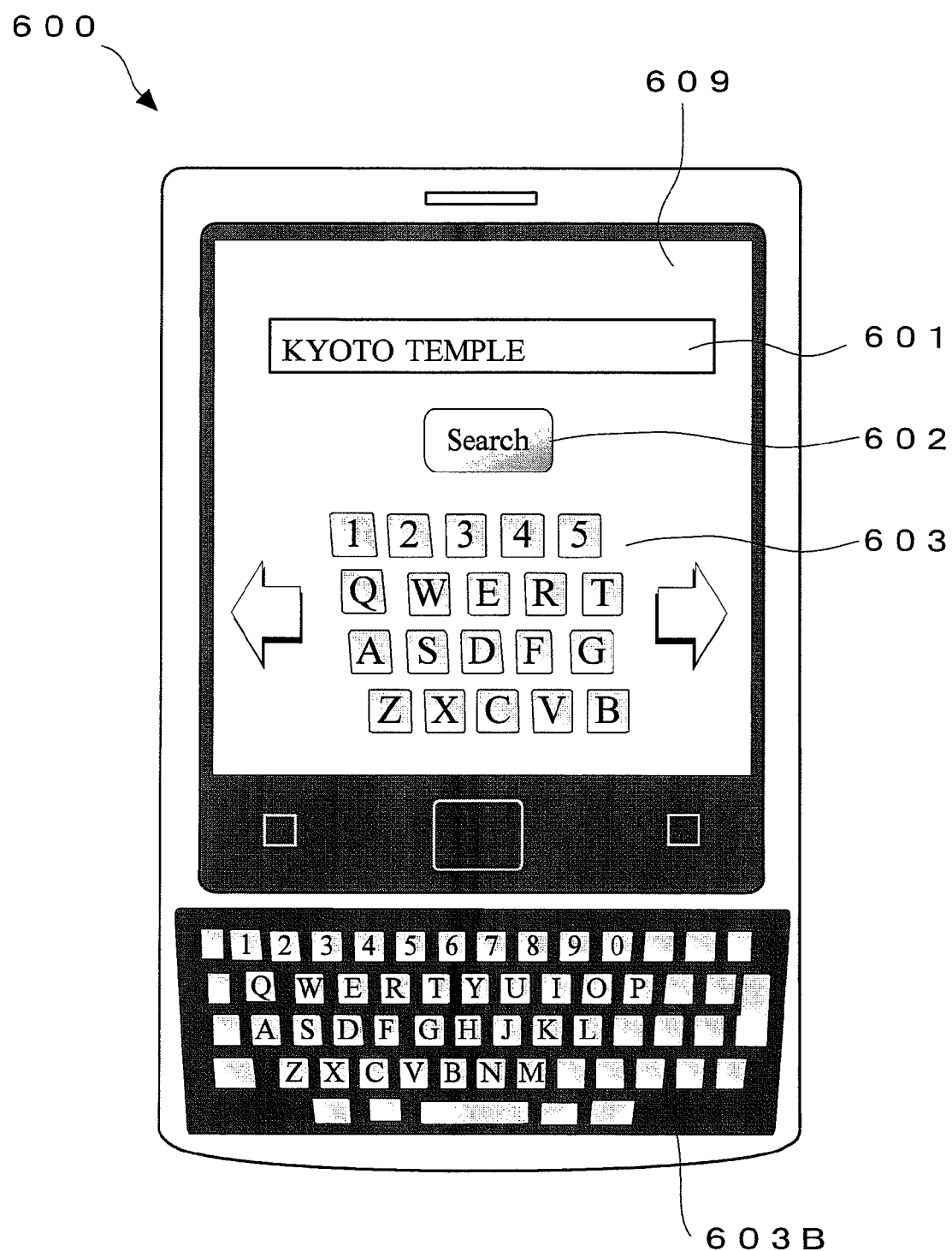
FIG. 5A is a view illustrating a screen example when a search key is selected on a mobile terminal 600 according to an embodiment.

With the example of FIG. 5A, two basic keywords "KYOTO" (corresponding to "Kyoto") and "TEMPLE" (corresponding to "temple") are transmitted to the information search server 200.

Figure 6B:
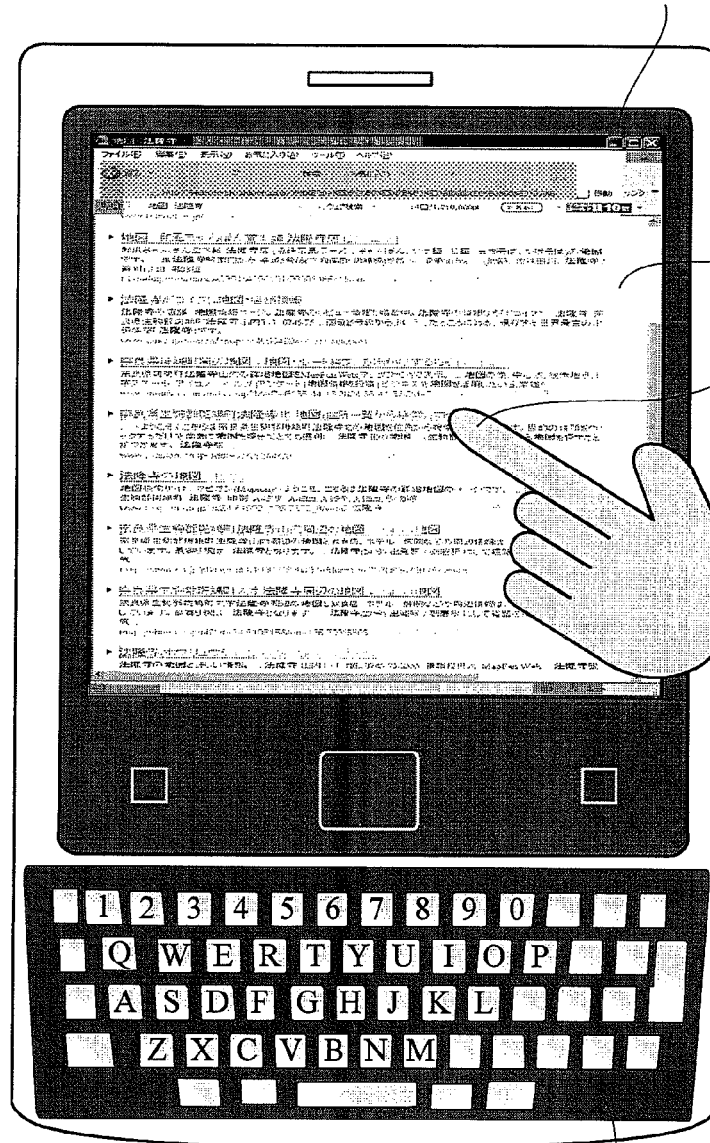
FIG. 6B is a schematic view illustrating an example of a search result displayed on the mobile terminal 600 according to an embodiment.

When the mobile terminal 600 receives relevant keyword data, the relevant keyword screen is displayed on the display 609 as illustrated in FIG. 6B. The relevant keyword screen displays a plurality of balloons 621 (621a to 621i and 621x to 621z are collectively referred to as "621") and connector 622 connecting each balloon 621. Meanwhile, the balloon 621 corresponds to balloon 521, the balloons 621a to 621i correspond to the balloons 521a to 521i and the connector 622 corresponds to the connector 522a.

Meanwhile, the balloon shape has an elliptical shape which is an example of a round shape compared to the circular balloon 521 such that English letters are accommodated in the balloons 621.

Further, with the example of FIG. 6B, the relevant keywords of the basic keyword "Kyoto" (corresponding to "Kyoto") displayed on the balloon 621e are "Map" displayed on the balloon 621a (corresponding to "map"), "□□ temple" (corresponding to "Kiyomizu temple") displayed on the balloon 621d and "World Heritage" (corresponding to "world heritage") displayed on the balloon 621c.

Further, relevant keywords (child) of the relevant keyword "□□ temple" are "Temple" (corresponding to "temple") displayed on the balloon 621f and "World Heritage", the relevant keywords (child) of the relevant keyword "World Heritage" are "□□ temple" and "Travel Agency" (corresponding to "travel agency") displayed on the balloon 621b, and the relevant keyword (child) of the relevant keyword "Map" is "Distance" (corresponding to "distance") displayed on the balloon 621x.

Similarly, the relevant keywords of the basic keyword "Temple" displayed on the balloon 621f are "□□ temple", "○Δ temple" (corresponding to "Kinkakuji temple") displayed on the balloon 621g and "∇∇ temple" (corresponding to "Horyu-ji temple") displayed on the balloon 621h. Further, the relevant keywords (child) of the relevant keyword "□□ temple" are "Kyoto" and "World Heritage", the relevant keywords (child) of the relevant keyword "○Δ temple" are "ΔΔ temple" (corresponding to "Ginkakuji temple") displayed on the balloon 621i and "Entrance Fee" (corresponding to "entrance fee") displayed on the balloon 621y, and the relevant keyword (child) of the relevant keyword "∇∇ temple" is "Pagoda" (corresponding to "five-story pagoda") displayed on the balloon 621z.

Figure 5B:
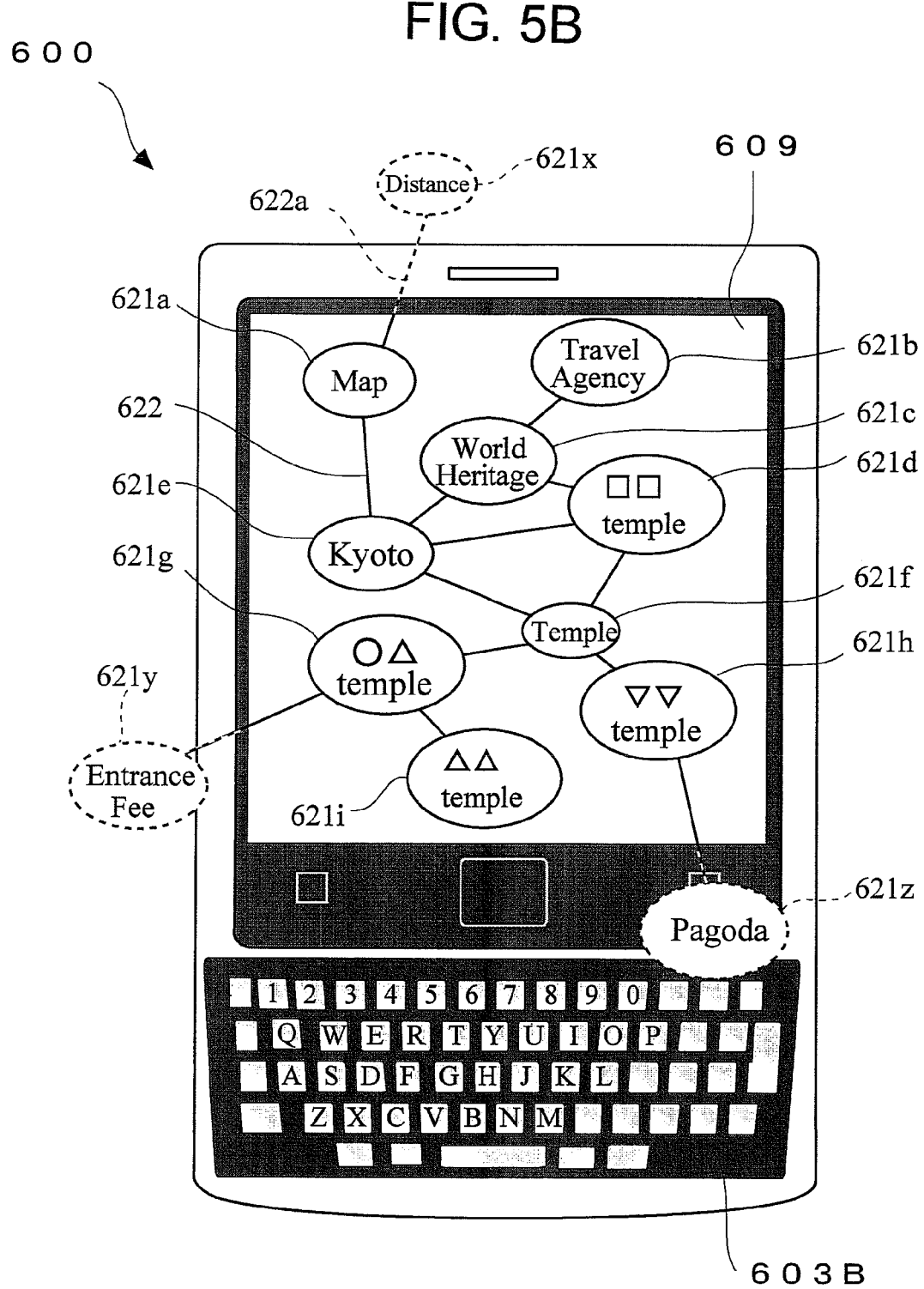
FIG. 5B is a view illustrating a screen example when a search key is selected on the mobile terminal 600 according to an embodiment.
Figure 5C:
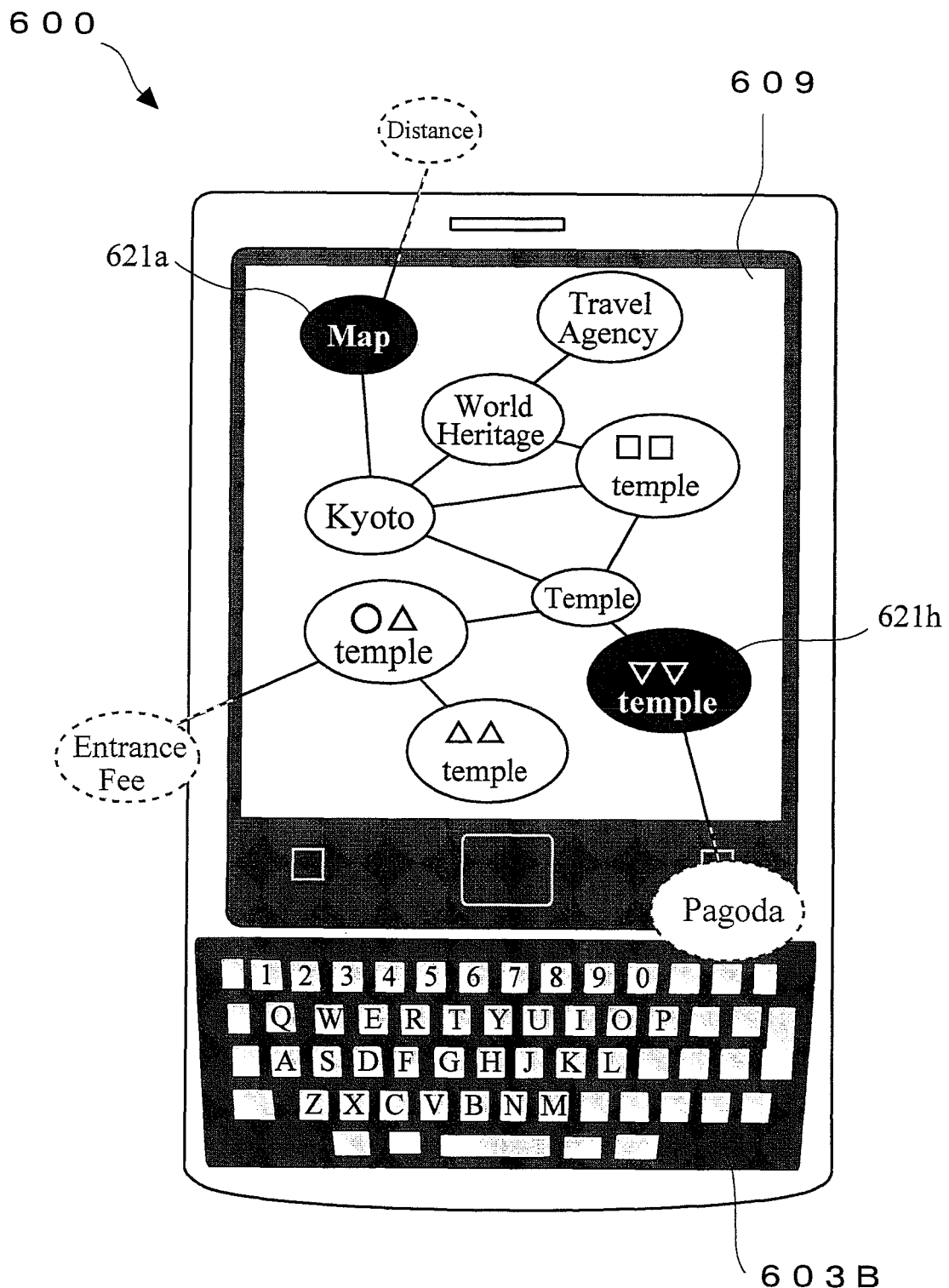
FIG. 5C is a view illustrating a screen example when a search key is selected on the mobile terminal 600 according to an embodiment.
Figure 5D:
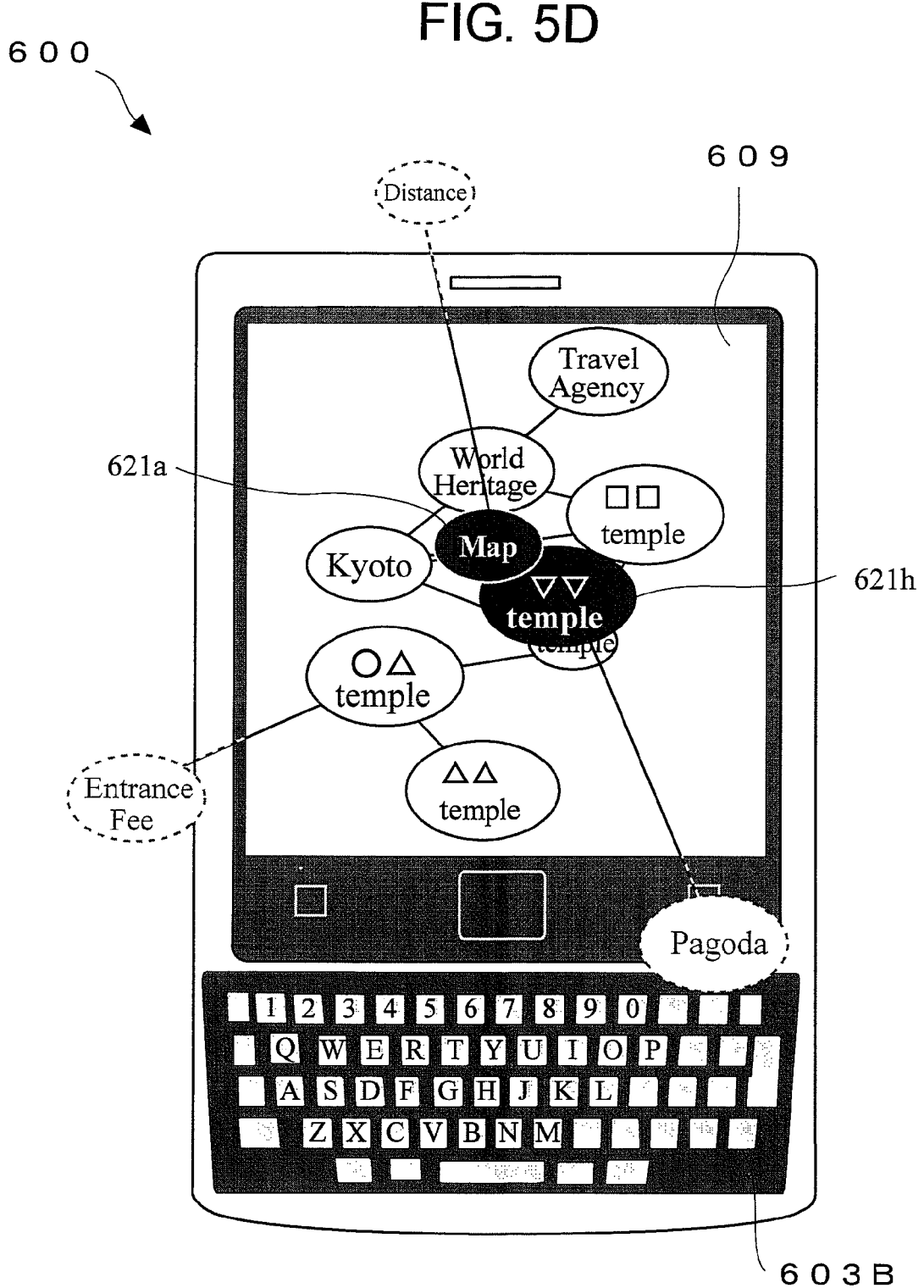
FIG. 5D is a view illustrating a screen example when a search key is selected on the mobile terminal 600 according to an embodiment.

Further, with the example of FIG. 5B, although the balloon (corresponding to the balloon 521x) which displays "Distance", the balloon 621y (corresponding to the balloon 521y) which displays "Entrance Fee" and the balloon 621z (corresponding to the balloon 521z) which displays "Pagoda" are not displayed in the screen of the display 609, these balloons can be moved into the screen and displayed by performing the moving/displaying operation.

Figure 6C:
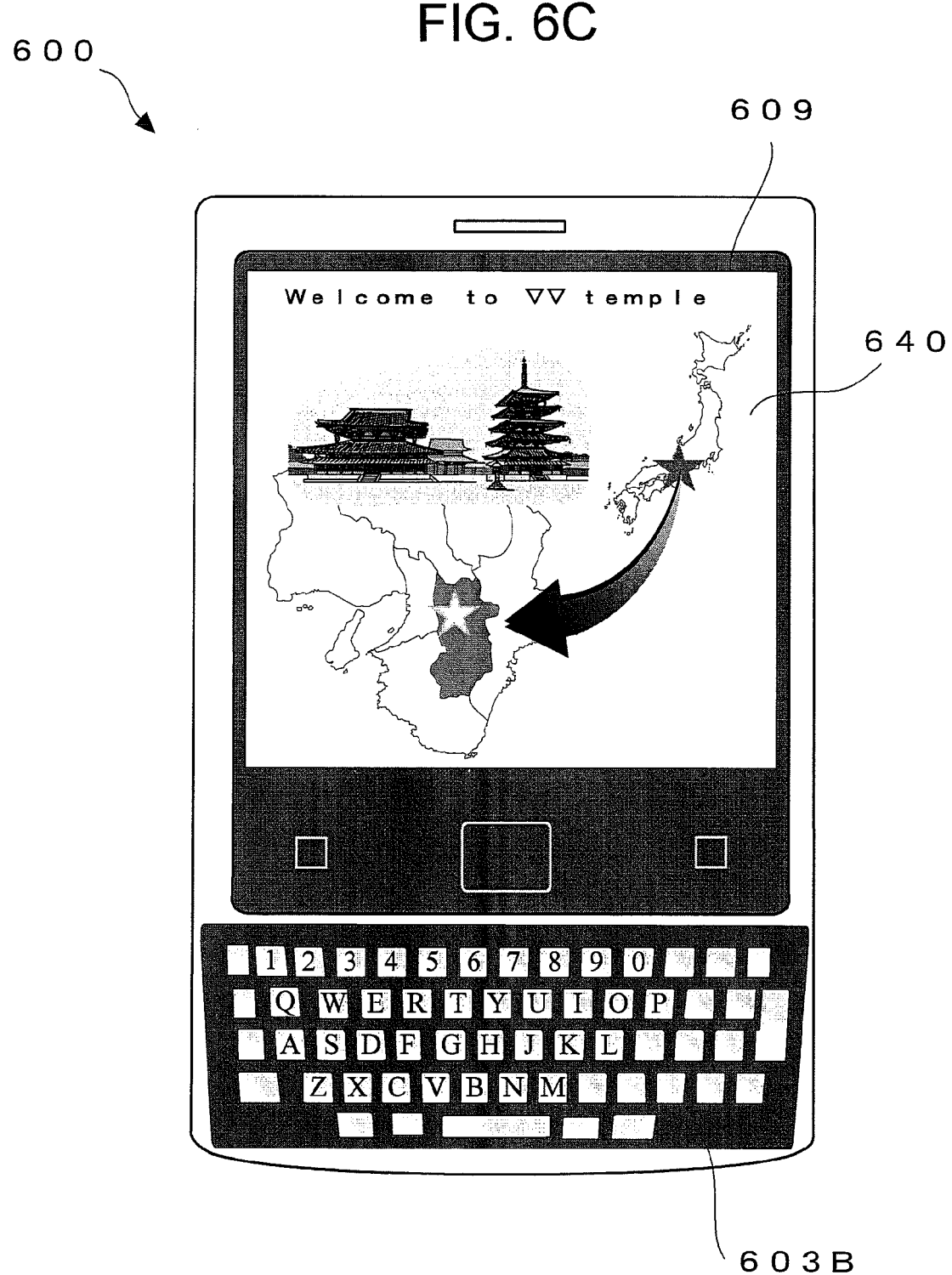
FIG. 6C is a schematic view illustrating an example of a search result displayed on the mobile terminal 600 according to an embodiment.

As illustrated in FIG. 6C, the user can make the balloon 621 a specified state in the relevant keyword screen. In FIG. 6C, the balloons 621a and 21h are specified state balloons.

Further, as illustrated in FIG. 6D, it is possible to make the specified state balloons 621a and 621h contact each other. Further, when the specified state balloons 621a and 621h contact each other, information is searched for based on the keywords displayed on the contacting specified state balloons 621a and 621h.

Further, when the specified state balloons 621 contact each other, the control unit (corresponding to the control unit 101 of the mobile terminal 100) of the mobile terminal 600 selects each keyword displayed on the specified state balloon 621 and transmits the keyword to the information search server 200 as the search keyword. With the example of FIG. 6D, two search keywords of "Map" and "VV temple" are transmitted to the information search server 200.

As described above, when receiving the search keywords from the mobile terminal 600, the information search server 200 acquires search result data using the search engine, and transmits search result data to the mobile terminal 600.

Next, the screen example of the search result displayed on the display 609 of the mobile terminal 600 will be described with reference to FIGS. 6A to 6C.

FIGS. 6A to 6C are schematic views illustrating an example of a search result displayed on the mobile terminal 600 according to an embodiment.

When the mobile terminal 600 displays search result data from the information search server 200, a list 630 of address information and reference information are displayed on the display 609 as illustrated in FIG. 6A. Further, as illustrated in FIG. 6B, the user selects one of pieces of address information (for example, a finger 635 touches the coordinate included in an area which displays address information). Further, as illustrated in FIG. 6C, when the user selects one of pieces of address information, the mobile terminal 600 acquires information 640 specified by this address information and displays the information 640 on the display 609.

That is, when receiving search result data from the information search server 200, the control unit of the mobile terminal 600 makes the display 609 display the list of address information and reference information, selects address information displayed at the coordinate position indicated by the coordinate signal received from the coordinate detecting unit (corresponding to the coordinate detecting unit 110) of the mobile terminal 600, acquires information based on the selected address information and controls the display 609 to display the information.

DESCRIPTION OF REFERENCE NUMERALS 100, 600: Mobile Terminal
101: Mobile Terminal/Control Unit
102: Mobile Terminal/Radio Transmitting/Receiving Unit
103: Mobile Terminal/Antenna
104: Mobile Terminal/Call Control Unit
105: Mobile Terminal/Speaker
106: Mobile Terminal/Microphone
107: Mobile Terminal/Incoming Call Notifying Unit
108: Mobile Terminal/Multi Touch Panel
109: Mobile Terminal/Display
110 Mobile Terminal/Coordinate Detecting Unit
200: Information Search Server
201: Information Search Server/Control Unit
202: Information Search Server/Transmitting/Receiving Unit
203: Information Search Server/Display
204: Information Search Server/Keyboard
210: Information Search Server/Relevant Keyword DB

The invention claimed is:

1. An information acquiring apparatus comprising:
an object display control unit that controls an input unit integrated with a display unit to display a plurality of first objects respectively corresponding to a plurality of keywords, and to move positions of part or all of the first objects in response to a user's operation of the input unit and to display the first objects;
a search key determining unit that, when the plurality of first objects contact based on the positions of at least part of the plurality of displayed first objects being moved and the at least part of the first objects are displayed, determines the keyword corresponding to each contacting first object as a search key; and
a search result acquiring unit that acquires search result information searched by either an external information search apparatus or an inner information searching unit based on the determined search key.

2. The information acquiring apparatus according to claim 1, wherein
a second object different from the plurality of first objects are further displayed on the input unit, and
the search key determining unit does not determine the keyword corresponding to the second object as a search key.

3. The information acquiring apparatus according to claim 1, wherein the search key determining unit determines as a higher ranking search key the keyword corresponding to a first object having a smaller movement amount among the plurality of first objects.

4. The information acquiring apparatus according to claim 1, further comprising a transmitting unit that transmits the selected search key to an external information search apparatus.

5. The information acquiring apparatus according to claim 1, wherein
the search result information includes a plurality of pieces of address information for respectively specifying a plurality of pieces of information searched for based on the search key by either the external information search apparatus or the inner information searching unit, and
the information acquiring apparatus further comprises a search result display control unit that controls the input unit to display the plurality of pieces of address information in a list format.

6. The information acquiring apparatus according to claim 5, further comprising:
an address information selecting unit that selects one of pieces of address information based on a user's operation, from a plurality of pieces of address information displayed in a list format on the input unit by the search display control unit;
an information acquiring unit that acquires information specified by the selected address information; and
an information display control unit that controls the input unit to display information acquired by the information acquiring unit.

7. The information acquiring apparatus according to claim 1, wherein
the search result information includes one address information for specifying one information searched for based on the search key by either the external information search apparatus or the inner information searching unit, and the information acquiring apparatus further comprises: an information acquiring unit that acquires information specified by the one address information; and an information display control unit that controls the input unit to display information acquired by the information acquiring unit.

8. A non-transitory recording medium, wherein an information acquiring program causes a computer to function as:

an object display control unit that controls an input unit integrated with a display unit to display a plurality of first objects respectively corresponding to a plurality of keywords, and to move positions of part or all of the first objects in response to a user's operation of the input unit and to display the first objects;

a search key determining unit that, when the plurality of first objects contact based on that the positions of at least part of the plurality of displayed first objects are moved and the at least part of the first objects are displayed, determines the keyword corresponding to each contacting first object as a search key; and a search result acquiring unit that acquires search result information searched by either an external information search apparatus or an inner information searching unit based on the determined search key; and the information acquiring program is computer-readably recorded.

9. An information acquiring method comprising:

an object display control step of controlling an input unit integrated with a display unit to display a plurality of first objects respectively corresponding to a plurality of keywords, and to move positions of part or all of the first objects in response to a user's operation of the input unit and to display the first objects;

a search key determining step of, when the plurality of first objects contact based on that the positions of at least part of the plurality of displayed first objects are moved and the at least part of the first objects are displayed, determining the keyword corresponding to each contacting first object as a search key; and a search result acquiring step of acquiring search result information searched by either an external information search apparatus or an inner information searching unit based on the determined search key.

10. An information acquiring apparatus comprising:

an object display control unit that controls a touch panel to display a plurality of objects respectively corresponding to a plurality of search keys, and to move and display the objects in response to a user's operation of the touch panel;

a search key determining unit that, when the plurality of objects contact based on that one or the plurality of displayed objects are moved and displayed, determines the search key corresponding to each contacting object; and a search result acquiring unit that transmits the determined search key to an information search server, and acquires search result information related to information searched for based on the search key by the information search serve.

11. An information acquiring system that comprises an information acquiring apparatus that acquires information through a network, and an external information search apparatus that is connected to the information acquiring apparatus through the network and that performs searching based on a search key from the information acquiring apparatus, wherein the information acquiring apparatus comprises:

an object display control unit that controls an input unit integrated with a display unit to display a plurality of first objects respectively corresponding to a plurality of keywords, and to move positions of part or all of the first objects in response to a user's operation of the input unit and to display the first objects;

a search key determining unit that, when the plurality of first objects contact based on that the positions of at least part of the plurality of displayed first objects are moved and the at least part of the first objects are displayed, determines the keyword corresponding to each contacting first object as a search key; and a search result acquiring unit that acquires search result information searched by either the external information search apparatus based on the determined search key.

* * * * *